(12) United States Patent
Imai et al.

(10) Patent No.: US 6,507,269 B2
(45) Date of Patent: Jan. 14, 2003

(54) VOLTAGE NONLINEAR RESISTOR

(75) Inventors: Toshiya Imai, Kawasaki; Takeshi Udagawa, Kisarazu; Yasunori Kasuga, Yokohama, all of (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/941,669

(22) Filed: Aug. 30, 2001

(65) Prior Publication Data

US 2002/0050913 A1 May 2, 2002

(30) Foreign Application Priority Data

Aug. 31, 2000 (JP) .................................... 2000-262949
Jun. 19, 2001 (JP) .................................... 2001-185285

(51) Int. Cl.$^7$ ................................................ H01K 7/13
(52) U.S. Cl. ................................................ 338/21; 338/20
(58) Field of Search ............................... 338/20, 21

(56) References Cited

U.S. PATENT DOCUMENTS

| | | | | |
|---|---|---|---|---|
| 3,905,006 A | * | 9/1975 | Matsuoka et al. | 338/21 |
| 4,031,498 A | * | 6/1977 | Hayashi et al. | 338/21 |
| 4,319,215 A | * | 3/1982 | Yamazaki et al. | 338/21 |
| 4,326,187 A | * | 4/1982 | Miyoshi et al. | 338/21 |
| 4,420,737 A | * | 12/1983 | Miyoshi et al. | 338/21 |
| 4,692,735 A | | 9/1987 | Shoji et al. | |
| 5,286,269 A | | 2/1994 | Paschke et al. | |
| 5,387,432 A | * | 2/1995 | Alimi et al. | 338/21 |
| 5,610,570 A | * | 3/1997 | Yamada et al. | 338/20 |

FOREIGN PATENT DOCUMENTS

JP    2516531    2/1994

OTHER PUBLICATIONS

Machine Translation of JP 2516531 (Feb. 1994).*

* cited by examiner

Primary Examiner—Karl D. Easthom
(74) Attorney, Agent, or Firm—Oblon, Spivak, McClelland, Maier & Neustadt, P.C.

(57) ABSTRACT

A voltage nonlinear resistor has a voltage nonlinear resistive body including zinc oxide, and a side face high-resistance layer provided on the side face of the resistive body. The high-resistance layer contains zinc in an amount of 1.0 to 25% by weigh in terms of its oxide (ZnO), boron in an amount of 1.0 to 10% by weight in terms of its oxide ($B_2O_3$), silicon in an amount of 0.1 to 5% by weight in terms of its oxide ($SiO_2$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$).

16 Claims, 2 Drawing Sheets

VOLTAGE NONLINEAR RESISTOR

CROSS-REFERENCE TO RELATED APPLICATIONS

This application is based upon and claims the benefit of priority from the prior Japanese Patent Applications No. 2000-262949, filed Aug. 31, 2000; and No. 2001-185285, filed Jun. 19, 2001, the entire contents of both of which are incorporated herein by reference.

BACKGROUND OF THE INVENTION

1. Field of the Invention

The present invention relates to a voltage nonlinear resistor useful in an overvoltage protection device for protecting, e.g., an electric power system, and to a method of manufacturing the voltage nonlinear resistor. More specifically, the present invention relates to a voltage nonlinear resistor having a high-resistance layer on the side surface of a voltage nonlinear resistive body, and also to a method of manufacturing the voltage nonlinear resistor.

2. Description of the Related Art

In an ordinary electric power system, an overvoltage protection device such as a surge arrestor or a surge absorber is employed to protect the power system by eliminating any overvoltage superimposed on the normal voltage. This overvoltage protection device is generally provided with a voltage nonlinear resistor. The voltage nonlinear resistor is a resistor that exhibits substantially insulating properties under the normal voltage, but exhibits a relatively low resistance when an overvoltage is applied to the resistor. Such a voltage nonlinear resistor has a sintered body (voltage nonlinear resistive body) that is formed from a composition containing ZnO (zinc oxide) as a main component. The composition further contains one or more metal oxides for obtaining voltage nonlinear resistance properties. The composition is mixed well, granulated, molded and sintered to provide the sintered body. On the side face of the sintered body, there is provided a high-resistance layer (side face high-resistance layer) formed of an electrically insulating material. The side face high-resistance layer serves to prevent the generation of flashover from the side face upon surge absorption.

Japanese Patent Unexamined Publication H8-172002 discloses a side face high-resistance layer mainly formed of an organic polymeric resin such as an epoxy resin. Japanese Patent Unexamined Publication H3-30301 discloses a side face high-resistance layer which is formed from zinc silicate ($ZnSiO_4$) or zinc antimony spinel ($Zn_7Si_2O_{12}$). Japanese Patent Unexamined Publication H10-312908 discloses a side face high-resistance layer formed from a crystalline inorganic substance including Zn—Sb—Si and Fe—Mn—Bi—Si. Japanese Patent Unexamined Publication H8-306506 discloses a side face high-resistance layer including zinc silicate ($ZnSiO_4$), as a main component, and zinc antimony spinel ($Zn_7Si_2O_{12}$) in which Fe is solid-solutioned, as a sub-component. Japanese Patent Unexamined Publication H5-205907 discloses a side face high-resistance layer formed of glass containing lead as a main component. Japanese Patent No. 2516531 discloses a side face high-resistance layer formed of bismuth borosilicate glass (B—Si—Bi—Zn—O).

In view of the increasing demand for electric power supply and the remarkable development of highly information-oriented society in recent years, a stable and cheap power supply is now strongly demanded. Under such circumstances, there is also an increasing demand to develop an overvoltage protection device that is highly reliable, smaller is size and more economical. To meet such a demand, it is now tried to miniaturize the overvoltage protection device through the reduction in thickness of the nonlinear resistor by increasing the magnitude of voltage per unit thickness of the voltage nonlinear resistor, and/or through the reduction in diameter of the voltage nonlinear resistor by enhancing the energy absorption capability of the nonlinear resistor.

However, the prior art side face high-resistance layer mainly composed of an organic polymeric resin such as an epoxy resin as proposed by Japanese Patent Unexamined Publication H8-172002 tends to be peeled away from the sintered body due to a large difference in thermal expansion coefficient between the sintered body and the high-resistance layer as heat is generated when a surge is imposed on the voltage nonlinear resistor. As a result, the voltage nonlinear resistor becomes impossible to exhibit an excellent energy absorption capability, making it impossible to miniaturize the nonlinear resistor beyond a certain extent. Namely, this voltage nonlinear resistor cannot have a sufficient protecting capability to resist against a surge such as thunderbolt impulse or overvoltage, which is required when the voltage nonlinear resistor is miniaturized through an increase in magnitude of voltage per unit thickness thereof or through a reduction in its diameter.

Incidentally, an overvoltage protection device whose container is made of a porcelain insulator has been traditionally employed. However, if the overvoltage protection device is exploded in the worst case due to an excessive surge, the porcelain insulator would be scattered around, endangering the surroundings. In view of this problem, an overvoltage protection device whose container is made of a polymeric rubber or resin is increasingly employed in a power distribution system in recent years.

However, the prior art side face high-resistance layer made from a crystalline inorganic substance including Zn—Sb—Si—O or Zn—Si—O as proposed in Japanese Patent Unexamined Publication H3-30301 has a poor water resistance. Thus, the electrical properties may be deteriorated by a little quantity of water permeated through the polymeric container wall. Therefore, the voltage nonlinear resistor provided with a side face high-resistance layer formed of the crystalline inorganic substance noted above would be not be suitably applied to an overvoltage protection device whose container is made of a polymer rubber or resin. If such resistor is applied to overvoltage protection device whose container is made of a polymer rubber or resin, it would be necessary to take a suitable measure to prevent the permeation of water, which is economically disadvantageous.

The side face high-resistance layer formed of a glass compound mainly composed of lead as proposed in Japanese Patent Unexamined Publication H5-205907 can overcome both of the aforementioned problems. However, since lead is a poisonous material, an enormous cost would be required for the prevention of intoxication in the manufacturing process, or for the disposition of residual materials, waste matters or waste liquid produced in the manufacturing process. At the same time, environmental contamination may occur depending upon a way in which used overvoltage protection devices are disposed.

In view of the above, a side face high-resistance layer which is characterized by being lead-free and is formed of bismuth borosilicate glass (B—Si—Bi—Zn—O) as taught in Japanese Patent No. 2516531 is increasingly employed in the voltage nonlinear resistor. However, the bismuth borosilicate glass composition as taught in Japanese Patent No. 2516531 has a region at which the composition can not be vitrified by baking at a temperature of 550° C. or less. Thus, this region of the composition requires baking at a temperature of above 550° C. or more. As a result, the glass component or components may be dissolved into the sintered body at the baking step, or the crystal structure of the sintered body may be transformed, thereby deteriorating the current-voltage characteristics as well as applied-voltage life characteristics of the voltage nonlinear resistor.

Additionally, the bismuth borosilicate glass composition as taught in Japanese Patent No. 2516531 has a region at which the glass exhibits a thermal expansion coefficient that greatly differs from that of the sintered body. As a result, the side face high-resistance layer may be peeled away from the sintered body, or cracks may be generated in the side face high-resistance layer when a surge is imposed on the voltage nonlinear resistor. Thus, it becomes impossible for the voltage nonlinear resistor to exhibit an excellent energy absorption capability, thereby making it impossible to miniaturize the nonlinear resistor beyond a certain extent.

BRIEF SUMMARY OF THE INVENTION

An object of the present invention is to provide a voltage nonlinear resistor that can overcome one or more of the above mentioned disadvantages in the prior art.

According to a first aspect of the present invention, there is provided a voltage nonlinear resistor comprising a voltage nonlinear resistive body comprising zinc oxide; and a side face high-resistance layer provided on the side face of the resistive body, the high-resistance layer containing zinc in an amount of 1.0 to 25% by weigh in terms of its oxide (ZnO), boron in an amount of 1.0 to 10% by weight in terms of its oxide ($B_2O_3$), silicon in an amount of 0.1 to 5% by weight in terms of its oxide ($SiO_2$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$).

According to a second aspect of the present invention, there is provided a voltage nonlinear resistor comprising a voltage nonlinear resistive body comprising zinc oxide; and a side face high-resistance layer provided on the side face of the resistive body, the high-resistance layer containing zinc in an amount of 1.0 to 25% by weigh in terms of its oxide (ZnO), boron in an amount of 1.0 to 10% by weight in terms of its oxide ($B_2O_3$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$).

According to a third aspect of the present invention, there is provided a voltage nonlinear resistor comprising a voltage nonlinear resistive body comprising zinc oxide; and a side face high-resistance layer provided on the side face of the resistive body, the high-resistance layer comprising a glass composition containing zinc in an amount of 1.0 to 25% by weigh in terms of its oxide (ZnO), boron in an amount of 1.0 to 10% by weight in terms of its oxide ($B_2O_3$), silicon in an amount of 0.1 to 5% by weight in terms of its oxide ($SiO_2$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$), and at least one filler selected from the group consisting of cordierite, mullite, β-eucryptite, β-spodumene, petalite, zirconyl phosphate, alumina, potash feldspar, soda feldspar, kaolin, sericite and silica, in an amount of 1 to 30% by weight based on the weight of the glass composition.

According to a fourth aspect of the present invention, there is provided a voltage nonlinear resistor comprising a voltage nonlinear resistive body comprising zinc oxide; and a side face high-resistance layer provided on the side face of the resistive body, the high-resistance layer comprising a glass composition containing zinc in an amount of 1.0 to 25% by weigh in terms of its oxide (ZnO), boron in an amount of 1.0 to 10% by weight in terms of its oxide ($B_2O_3$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$), and at least one filler selected from the group consisting of cordierite, mullite, β-eucryptite, β-spodumene, petalite, zirconyl phosphate, alumina, potash feldspar, soda feldspar, kaolin, sericite and silica, in an amount of 1 to 30% by weight based on the weight of the glass composition.

A voltage non linear resistor according to an embodiment of the present invention can be manufactured by preparing a paste using the raw materials which constitute the side face high-resistance layer together with a liquid medium, and coating the paste on the side face of the voltage nonlinear resistive body, and baking the coated paste.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Specific embodiments according to the present invention will be explained in detail as follows.

A voltage nonlinear resistor according to the present invention includes a voltage nonlinear resistive body comprising zinc oxide, and a high-resistance layer provided on the side face of the resistive body.

The resistive body is usually provided by a sintered body composed mainly of zinc oxide. The sintered body may contain one or more additives such as bismuth oxide ($Bi_2O_3$), antimony oxide ($Sb_2O_3$), manganese oxide ($MnO_2$) and nickel oxide (NiO) in order to adjust the voltage nonlinearity of the sintered body. These additives may, in total, constitute 1% to 20 mol % of the sintered body (balance of zinc oxide). The sintered body may be obtained in a known manner.

The side face high-resistance layer according to the present invention, as well as the sintered body are lead (Pb)-free.

In a first embodiment, the side face high-resistance layer is formed of a composition (expediently referred to as a first bismuth glass composition hereinafter) which contains zinc in an amount of 1.0 to 25% by weigh in terms of its oxide (ZnO), boron in an amount of 1.0 to 10% by weight in terms of its oxide ($B_2O_3$), silicon in an amount of 0.1 to 5% by weight in terms of its oxide ($SiO_2$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of bismuth oxide ($Bi_2O_3$). Preferably, the first bismuth glass composition contains zinc in an amount of 5 to 20% by weigh in terms of its oxide (ZnO), boron in an amount of 1.0 to 10% by weight in terms of its oxide ($B_2O_3$), silicon in an amount of 0.5 to 5% by weight in terms of its oxide ($SiO_2$), aluminum in an amount of 0.1 to 2% by weight in terms of its oxide ($Al_2O_3$), and barium in an amount of 0.1 to 2% by weight in terms of its oxide (BaO).

Usually, the side face high-resistance layer according to the first embodiment contains zinc in the form its oxide (ZnO), boron in the form of its oxide ($B_2O_3$), silicon in the form of its oxide ($SiO_2$), aluminum in the form of its oxide ($Al_2O_3$), barium in the form of its oxide (BaO), and bismuth in the form of its oxide ($Bi_2O_3$).

In a second embodiment, the side face high-resistance layer is formed of a composition (expediently referred to as a second bismuth glass composition hereinafter) which contains zinc in an amount of 1.0 to 25% by weigh in terms of its oxide (ZnO), boron in an amount of 1.0 to 10% by weight in terms of its oxide ($B_2O_3$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$). Preferably, the second bismuth glass composition contains zinc in an amount of 5 to 20% by weigh in terms of its oxide (ZnO), boron in an amount of 1.0 to 10% by weight in terms of its oxide ($B_2O_3$), aluminum in an amount of 0.1 to 2% by weight in terms of its oxide ($Al_2O_3$), and barium in an amount of 0.1 to 2% by weight in terms of its oxide (BaO).

Usually, the side face high-resistance layer according to the first embodiment contains zinc in the form its oxide (ZnO), boron in the form of its oxide ($B_2O_3$), aluminum in the form of its oxide ($Al_2O_3$), barium in the form of its oxide (BaO), and bismuth in the form of its oxide ($Bi_2O_3$).

In a third embodiment, the side face high-resistance layer is formed of a composition comprising the first or second bismuth glass composition added with at least one filler selected from the group consisting of cordierite, mullite, β-eucryptite, β-spodumene, petalite, zirconyl phosphate, alumina, potash feldspar, soda feldspar, kaolin, sericite and silica, in an amount of 1 to 30% by weight based on the weight of the first or second bismuth glass composition. Preferably, the filler is added in an amount of 3 to 27% by weight based on the weight of the first or second bismuth glass composition.

Figure 1:
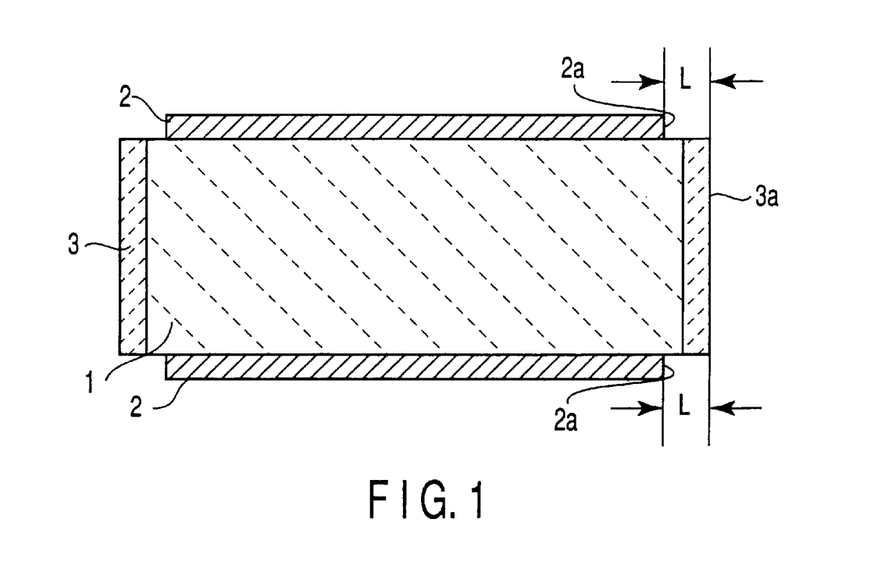
FIG. 1 is a cross-sectional view illustrating a voltage nonlinear resistor according to an embodiment of the present invention.

FIG. 1 shows a voltage nonlinear resistor according to an embodiment of the present invention. The voltage nonlinear resistor shown in FIG. 1 has a disk-shaped sintered body 1 as described above. A pair of electrodes 2, 2 made of, e.g., aluminum are provided on the front and rear circular main surfaces of the sintered body 1, respectively. A side face high-resistance layer 3 as described above is formed on the side face of the sintered body 1. The side face high-resistance layer 3 may have a thickness of 10 $\mu$m to 500 $\mu$m.

In one embodiment, the distance L between the outer peripheral edge 2a of the electrode 2 and the outer peripheral surface 3a of side face high-resistance layer 3 is from 0 to the thickness of the high-resistance layer 3 +0.01mm.

The side face high-resistance layer according to the present invention may be prepared by first providing the composition according to the first, second or third embodiment as described above. The oxide components as described above, and the filler as described above are usually in the form of powder. The powder conveniently has an average particle diameter of 0.5 to 30 $\mu$m.

The composition thus provided is mixed with a liquid medium to provide a paste or slurry. The liquid medium usually contains an organic binder. Preferably, the liquid medium containing an organic binder is provided by an aqueous solution of a polyvinyl alcohol binder, an aqueous solution of a cellulosic binder, an aqueous solution of acrylic binder, or a solution of ethyl cellulose in terpineol.

The paste or slurry thus prepared may be coated on the side face of the sintered body and baked. The baking can be carried out at a temperature of 550° C. or less, more specifically 380 to 550° C. The baking can vitrify the coated composition.

The present invention will be described by way of its Examples below. The present invention should not be limited to these Examples. In these Examples, the glass compositions used to prepare side face high-resistance layer according to the invention could be vitrified by baking at 380–550° C.

EXAMPLE I

Voltage nonlinear resistors were manufactured according to the following procedures.

<The Preparation of a Sintered Body>

0.5 mol % of bismuth oxide ($Bi_2O_3$), 0.5 mol % of manganese oxide ($MnO_2$), 1 mol % of cobalt oxide ($Co_2O_3$), 1 mol % of nickel oxide (NiO) and 1 mol % of antimony trioxide ($Sb_2O_3$) were added to zinc oxide (ZnO). The mixture was mixed with water and an organic binder in a mixer to prepare a slurry. The slurry was spray-granulated by means of a spray dryer. The granulated material was placed in a mold and compressed at a predetermined pressure to form a disk having a diameter of 50 mm. This disk was then subjected to a heat treatment in air at 400 to 500° C. to degrease, and then was sintered at 1200° C. to give a disk-shaped sintered body.

<The Formation of the Side Face High-resistance Layer>

Mixtures of the bismuth glass components indicated in Table 1 below in amounts indicated also in Table 1, as well as mixtures of the bismuth glass components indicated in Table 1 in amounts indicated also in Table 1 and the filler indicated in Table 1 in amounts (based on the total weight of the bismuth glass components) were each mixed with an organic binder and water to prepare slurries.

Then, each of these slurries was coated on the side face of the disk-shaped sintered body and baked to form a side face high-resistance layer.

<The Formation of Electrodes>

The front and rear circular surfaces of each of the sintered bodies each having the aforementioned side face high-resistance layer were polished, and then, the polished surfaces were subjected to flame spray coating to form aluminum electrodes.

Thus, 31 kinds of voltage nonlinear resistor each having a structure as shown in FIG. 1 were fabricated.

Subsequently, an impulse current of 4/10 µs waveform was applied to each of the voltage nonlinear resistors (samples) in such a manner that the starting current intensity was set at 10 kA, and the current intensity was increased by an increment of 5 kA every 5 minutes so as to measure the current intensity at which the sample was caused to breakdown (impulse current at breakdown), thus evaluating the overvoltage protecting capability (impulse withstanding capability) of each of the samples. Furthermore, each of the samples was evaluated for its applied-voltage life characteristic by placing the sample in a drying oven maintained at a temperature of 115° C. and applying an AC voltage for 100 hours. The AC voltage applied was such that it allowed an electric current of 1 mA to pass through each sample if the sample was placed at room temperature. The resistive component leak current ($IR_{0h}$) immediately after the application of the AC voltage, as well as the resistive component leak current ($IR_{100h}$) 100 hours after the application of the AC voltage were measured, and the ratio $IR_{100h}/IR_{0h}$ was calculated, thus evaluating the applied-voltage life characteristic of each sample.

The results obtained are shown in Table 1.

TABLE 1

| Sample No. | Glass Components (% by weight) (Balance: $Bi_2O_3$) | | | | | Filler | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 1 | 0.1 | 0.1 | 0.01 | 0.03 | 0.03 | None | 45 | 1.93 |
| 2 | 1 | 0.1 | 0.01 | 0.03 | 0.03 | None | 50 | 1.75 |
| 3 | 1 | 1 | 0.01 | 0.03 | 0.03 | None | 60 | 1.53 |
| 4 | 1 | 1 | 0.1 | 0.03 | 0.03 | None | 65 | 1.47 |
| 5 | 1 | 1 | 0.1 | 0.05 | 0.03 | None | 65 | 1.33 |
| 6 | 1 | 1 | 0.1 | 0.05 | 0.05 | None | 80 | 0.97 |
| 7 | 1 | 5 | 5 | 1 | 1 | None | 80 | 0.94 |
| 8 | 10 | 5 | 0.1 | 1 | 1 | None | 85 | 0.95 |
| 9 | 10 | 5 | 0.1 | 1 | 1 | Cordierite (0.1%) | 85 | 0.95 |
| 10 | 10 | 5 | 0.1 | 1 | 1 | Cordierite (1%) | 100 | 0.93 |
| 11 | 10 | 5 | 0.1 | 1 | 1 | Cordierite (10%) | 100 | 0.94 |
| 12 | 10 | 5 | 0.1 | 1 | 1 | Cordierite (30%) | 105 | 0.92 |
| 13 | 10 | 5 | 0.1 | 1 | 1 | Cordierite (40%) | 65 | 1.21 |
| 14 | 10 | 5 | 0.1 | 1 | 1 | Mullite (0.1%) | 80 | 0.96 |
| 15 | 10 | 5 | 0.1 | 1 | 1 | Mullite (1%) | 100 | 0.95 |
| 16 | 10 | 5 | 0.1 | 1 | 1 | Mullite (10%) | 105 | 0.97 |
| 17 | 10 | 5 | 0.1 | 1 | 1 | Mullite (30%) | 100 | 0.94 |
| 18 | 10 | 5 | 0.1 | 1 | 1 | Mullite (40%) | 65 | 1.33 |
| 19 | 10 | 5 | 5 | 1 | 1 | None | 85 | 0.91 |
| 20 | 10 | 5 | 5 | 3 | 3 | None | 80 | 0.92 |
| 21 | 10 | 10 | 5 | 3 | 3 | None | 80 | 0.93 |
| 22 | 10 | 10 | 0.1 | 1 | 1 | None | 85 | 0.90 |
| 23 | 10 | 10 | 0.1 | 0.05 | 0.05 | None | 85 | 0.91 |
| 24 | 25 | 10 | 5 | 3 | 3 | None | 85 | 0.90 |
| 25 | 25 | 10 | 5 | 5 | 5 | None | 65 | 1.38 |
| 26 | 25 | 10 | 10 | 5 | 5 | None | 60 | 1.43 |
| 27 | 25 | 20 | 10 | 5 | 5 | None | 55 | 1.47 |

TABLE 1-continued

| Sample No. | Glass Components (% by weight) (Balance: $Bi_2O_3$) | | | | | Filler | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 28 | 30 | 20 | 10 | 3 | 3 | None | 50 | 1.54 |
| 29 | 30 | 20 | 5 | 3 | 3 | None | 65 | 1.31 |
| 30 | 30 | 10 | 5 | 3 | 3 | None | 65 | 1.35 |
| 31 | 30 | 20 | 10 | 5 | 5 | None | 40 | 1.83 |

As apparent from Table 1, the voltage nonlinear resistors of sample Nos. 6, 7, 8 and 19–24 according to the present invention having side face high-resistance layers formed of a bismuth glass containing, as a main component, Bi in terms of its oxide, and, as subsidiary components, Zn, B, Si, Al and Ba in terms of their oxides each falling within the ranges of: ZnO=1.0–25 wt %; $B_2O_3$=1.0–10 wt %; $SiO_2$=0.1–5 wt %; $Al_2O_3$=0.05–3 wt %; and BaO=0.05–3 wt % were found excellent in applied-voltage life characteristic in view of $IR_{100h}/IR_{0h}$ ratio of: $IR_{100h}/IR_{0h}$=0.9 to 1.0. Furthermore, in the cases of the voltage nonlinear resistors of sample Nos. 6, 7, 8 and 19–24, the impulse current at breakdown was as high as 80 kA or more, thus all indicating an excellent impulse withstanding capability.

On the other hand, the voltage nonlinear resistors of sample Nos. 1–5 and 25–31 having the side face high-resistance layers formed of a bismuth glass containing, as a main component, Bi in terms of its oxide, and, as subsidiary components, Zn, B, Si, Al and Ba in terms of their oxides not falling within the ranges specified in the invention were found poor in applied-voltage life characteristic in view of the $IR_{100h}/IR_{0h}$ ratio $\geq 1.0$. Furthermore, in the cases of the voltage nonlinear resistors of sample Nos. 1–5 and 25–31, the impulse current at breakdown was as low as 40–65 kA, thus indicating an inferior impulse withstanding capability.

Further, the voltage nonlinear resistors of sample Nos. 10–12 and 15–17 having the side face high-resistance layers formed of a bismuth glass containing, as a main component, Bi in terms of its oxide, and, as subsidiary components, Zn, B, Si, Al and Ba in terms of their oxides all falling within the ranges specified in the invention, and additionally containing 1 to 30% by weight of cordierite ($Mg_2Al_4Si_5O_{18}$) filler or mullite ($Al_6Si_2O_{13}$) filler, were found excellent in applied-voltage life characteristic in view of the $IR_{100h}/IR_{0h}$ ratio of 0.9–1.0. Furthermore, in the cases of the voltage nonlinear resistors s of sample Nos. 10–12 and 15–17, the impulse current at breakdown was as high as 100 kA or more which was higher than those not containing the fillers, thus all indicating a further improved impulse withstanding capability.

However, the voltage nonlinear resistors of sample Nos. 9 and 14 having the side face high-resistance layers formed employing less than 1% by weight of the filler were found almost the same as the voltage nonlinear resistors of sample Nos. 6, 7, 8 and 19–24 each containing no filler, with respect to the $IR_{100h}/IR_{0h}$ ratio and the impulse current at breakdown. On the other hand, the voltage nonlinear resistors of sample Nos. 13 and 18 having the side face high-resistance layers formed employing more than 30% by weight of the filler were found poor in applied-voltage life characteristic in view of the $IR_{100h}/IR_{0h}$ ratio $\geq 1.0$. Furthermore, in these voltage nonlinear resistors, the impulse current at breakdown was as low as 65 kA, thus all indicating an inferior impulse withstanding capability.

As explained above, it will be understood from Example I that when the side face high-resistance layer formed of a bismuth glass containing, as a main component, Bi in terms of its oxide and, as subsidiary components, Zn, B, Si, Al and Ba in terms of their oxides each falling within the ranges of: ZnO=1.0–25 wt %; $B_2O_3$=1.0–10 wt %; $SiO_2$=0.1–5 wt %; $Al_2O_3$=0.05–3 wt %; and BaO=0.05–3 wt % is provided on a sintered body containing zinc oxide as a main component, it would be possible to obtain a voltage nonlinear resistor which is excellent in current-voltage characteristic as well as in applied-voltage life characteristic. Furthermore, since the thermal expansion coefficient of the side face high-resistance layer is close to that of the sintered body, and at the same time, since the adhesive strength of the side face high-resistance layer to the sintered body is strong, it would be possible to realize a voltage nonlinear resistor exhibiting a high energy absorption capability.

It will be also understood from Example I that when the side face high-resistance layer formed of a bismuth glass containing, as a main component, Bi in terms of its oxide and, as subsidiary components, Zn, B, Si, Al and Ba in terms of their oxides all falling within the aforementioned ranges, and additionally containing 1 to 30% by weight of cordierite ($Mg_2Al_4Si_5O_{18}$) filler and mullite ($Al_6Si_2O_{13}$) filler is formed on the side face of the sintered body, it would be possible to realize a voltage nonlinear resistor exhibiting a further enhanced impulse withstanding capability and a further enhanced energy absorption capability.

EXAMPLE II

Voltage nonlinear resistors were manufactured following the same procedures as in Example I, except that the components used to prepare side face high-resistance layers were as indicated in Table 2 below.

The impulse current at breakdown of each resistor was measured as in Example I, and the ratio $IR_{100h}/IR_{0h}$ for each resistor was determined as in Example I. The results are shown in Table 2.

TABLE 2

| Sample No. | Glass Components (% by weight) (Balance: $Bi_2O_3$) | | | | Filler | Impulse Current At Breakdown (kA) | $IR_{100h}/IR_{0h}$ |
|---|---|---|---|---|---|---|---|
| | ZnO | $B_2O_3$ | BaO | $Al_2O_3$ | | | |
| 1 | 0.1 | 0.1 | 0.03 | 0.03 | None | 40 | 1.51 |
| 2 | 1 | 0.1 | 0.03 | 0.03 | None | 55 | 1.62 |
| 3 | 1 | 1 | 0.05 | 0.03 | None | 65 | 1.37 |
| 4 | 1 | 1 | 0.05 | 0.05 | None | 80 | 0.89 |
| 5 | 1 | 5 | 1 | 1 | None | 85 | 0.86 |
| 6 | 10 | 5 | 1 | 1 | None | 85 | 0.85 |
| 7 | 10 | 5 | 1 | 1 | Cordierite (0.1%) | 85 | 0.86 |
| 8 | 10 | 5 | 1 | 1 | Cordierite (1%) | 100 | 0.83 |

TABLE 2-continued

| Sample No. | Glass Components (% by weight) (Balance: $Bi_2O_3$) | | | | Filler | Impulse Current At Breakdown (kA) | $IR_{100h}/IR_{0h}$ |
|---|---|---|---|---|---|---|---|
| | ZnO | $B_2O_3$ | BaO | $Al_2O_3$ | | | |
| 9  | 10 | 5  | 1    | 1    | Cordierite (10%) | 100 | 0.82 |
| 10 | 10 | 5  | 1    | 1    | Cordierite (30%) | 100 | 0.83 |
| 11 | 10 | 5  | 1    | 1    | Cordierite (40%) | 65  | 1.68 |
| 12 | 10 | 5  | 1    | 1    | Mullite (0.1%)   | 85  | 0.87 |
| 13 | 10 | 5  | 1    | 1    | Mullite (1%)     | 100 | 0.85 |
| 14 | 10 | 5  | 1    | 1    | Mullite (10%)    | 105 | 0.84 |
| 15 | 10 | 5  | 1    | 1    | Mullite (30%)    | 105 | 0.86 |
| 16 | 10 | 5  | 1    | 1    | Mullite (40%)    | 60  | 1.73 |
| 17 | 10 | 5  | 3    | 3    | None | 80 | 0.89 |
| 18 | 10 | 10 | 3    | 3    | None | 85 | 0.88 |
| 19 | 10 | 10 | 1    | 1    | None | 85 | 0.86 |
| 20 | 10 | 10 | 0.05 | 0.05 | None | 80 | 0.90 |
| 21 | 25 | 10 | 3    | 3    | None | 80 | 0.89 |
| 22 | 25 | 10 | 5    | 5    | None | 65 | 1.24 |
| 23 | 25 | 20 | 5    | 5    | None | 55 | 1.32 |
| 24 | 30 | 20 | 3    | 3    | None | 60 | 1.37 |
| 25 | 30 | 10 | 3    | 3    | None | 65 | 1.28 |
| 26 | 30 | 20 | 5    | 5    | None | 40 | 1.58 |

As apparent from Table 2, the voltage nonlinear resistors of sample Nos. 4–6 and 17–21 according to the present invention having the side face high-resistance layers formed of a bismuth glass containing, as a main component, Bi in terms of its oxide, and, as subsidiary components, Zn, B, Al and Ba in terms of their oxides each falling within the ranges of: ZnO=1.0–25 wt %; $B_2O_3$=1.0–10 wt %; $Al_2O_3$=0.05–3 wt %; and BaO=0.05–3 wt % were found excellent in applied-voltage life characteristic in view of the $IR_{100h}/IR_{0h}$ ratio of 0.8 to 0.9. Furthermore, in the cases of the voltage nonlinear resistors of sample Nos. 4–6 and 17–21, the impulse current at breakdown was as high as 80 kA or more, thus all indicating an excellent impulse withstanding capability.

On the other hand, the voltage nonlinear resistors of sample Nos. 1–3 and 22–26 having the side face high-resistance layers thereof formed of a bismuth glass containing, as a main component, Bi in terms of its oxide, and, as subsidiary components, Zn, B, Al and Ba in terms of their oxides not falling within the ranges specified in the invention were found poor in applied-voltage life characteristic in view of the $IR_{100h}/IR_{0h}$ ratio $\geq 1.0$. Furthermore, in the cases of the voltage nonlinear resistors of sample Nos. 1–3 and 22–26, the impulse current at breakdown was as low as 40–65 kA, thus all indicating an inferior impulse withstanding capability.

Further, the voltage nonlinear resistors of sample Nos. 8–10 and 13–15 having the side face high-resistance layers formed of a bismuth glass containing, as a main component, Bi in terms of its oxide, and, as subsidiary components, Zn, B, Al and Ba in terms of their oxides all falling within the ranges specified in the invention, and additionally containing 1 to 30% by weight of cordierite ($Mg_2Al_4Si_5O_{18}$) filler or mullite ($Al_6Si_2O_{13}$) filler, were found excellent in applied-voltage life characteristic in view of the $IR_{100h}/IR_{0h}$ ratio of 0.8–0.9. Furthermore, in the cases of the voltage nonlinear resistors of sample Nos. 8–10 and 13–15, the impulse current at breakdown was as high as 100 kA or more which was higher than those not containing the fillers, thus all indicating a further excellent impulse withstanding capability.

However, the voltage nonlinear resistors of sample Nos. 7 and 12 having the side face high-resistance layers were formed employing less than 1% by weight of the filler were found almost the same as the voltage nonlinear resistors of sample Nos. 4–6 and 17–21 each containing no filler, with respect to the $IR_{100h}/IR_{0h}$ ratio and the impulse current at breakdown. On the other hand, the voltage nonlinear resistors of sample Nos. 11 and 16 having the side face high-resistance layers formed employing more than 30% by weight of the filler were found poor in applied-voltage life characteristic in view of the $IR_{100h}/IR_{0h}$ ratio $\geq 1.0$. Furthermore, in these voltage nonlinear resistors, the impulse current at breakdown was as low as 65 kA or 60 kA, thus all indicating an inferior impulse withstanding capability.

As explained above, it will be understood from Example II that since the side face high-resistance layer which is formed of a bismuth glass containing, as a main component, Bi in terms of its oxide, and, as subsidiary components, Zn, B, Al and Ba in terms of their oxides each falling within the ranges of: ZnO=1.0–25 wt %; $B_2O_3$=1.0–10 wt %; $Al_2O_3$=0.05–3 wt %; and BaO=0.05–3 wt % can be formed on a sintered body containing zinc oxide as a main component at such a low baking temperature which would not allow components of the side face high-resistance layer to permeate into the sintered body or which would not cause any change in the crystal structure of the sintered body, it would be possible to obtain a voltage nonlinear resistor which is excellent in current-voltage characteristic as well as in applied-voltage life characteristic. Furthermore, since the thermal expansion coefficient of the side face high-resistance layer is close to that of the sintered body, and at the same time, since the adhesive strength of the side face high-resistance layer to the sintered body is strong, it would be possible to realize a voltage nonlinear resistor exhibiting a high energy absorption capability.

It will be also understood from Example II that when the side face high-resistance layer formed of a bismuth glass containing, as a main component, Bi in terms of its oxide, and, as subsidiary components, Zn, B, Al and Ba in terms of their oxides all falling within the aforementioned amounts, and additionally containing 1 to 30% by weight of cordierite ($Mg_2Al_4Si_5O_{18}$) filler and mullite ($Al_6Si_2O_{13}$) filler is provided on a side face of the sintered body, it would be possible to realize a voltage nonlinear resistor exhibiting a further enhanced impulse withstanding capability and a further enhanced energy absorption capability.

EXAMPLE III

Four slurries for forming the side face high-resistance layers were prepared as shown below.

(1) A bismuth glass powder composition containing 10 wt % of ZnO, 5 wt % of $B_2O_3$, 1.0 wt % of $SiO_2$, 1.0 wt % of $Al_2O_3$, 1.0 wt % of BaO, and the balance of $Bi_2O_3$ was mixed with water and an organic binder to prepare a first slurry.

(2) A bismuth glass powder composition containing 10 wt % of ZnO, 5 wt % of $B_2O_3$, 1.0 wt % of $SiO_2$, 1.0 wt % of $Al_2O_3$, 1.0 wt % of BaO and the balance $Bi_2O_3$ was mixed with 10 wt % (based on the total weight of the glass powder composition) of cordierite ($Mg_2Al_4Si_5O_{18}$) filler. The mixture was mixed with water and an organic binder to prepare a second slurry.

(3) A bismuth glass powder composition containing 10 wt % of ZnO, 5 wt % of $B_2O_3$, 1.0 wt % of $Al_2O_3$, 1.0 wt % of BaO and the balance of $Bi_2O_3$ was mixed with water and an organic binder to prepare a third slurry.

(4) A bismuth glass powder composition containing 10 wt % of ZnO, 5 wt % of $B_2O_3$, 1.0 wt % of $Al_2O_3$ Al, 1.0 wt % of BaO and the balance of $Bi_2O_3$ was mixed with 10 wt % (based on the total weight of the glass powder) of cordierite ($Mg_2Al_4Si_5O_{18}$) filler. The mixture was mixed with water and an organic binder to prepare a fourth slurry.

Then, each of these slurries was coated on the side face of a disk-shaped sintered body prepared as in Example I and baked to form a side face high-resistance layer.

Further, a first side face high-resistance layer consisting of a mixture of zinc silicate ($Zn_2SiO_4$) and zinc antimony spinel ($Zn_7Sb_2O_{12}$) was formed on the side face of a disk-shaped sintered body prepared as in Example I, and then, the first, second, third or fourth slurries prepared above was coated on the first side face high-resistance layer and baked to form a second side face high-resistance layer, thereby forming a side face high-resistance layer of 2-layer structure.

Finally, aluminum electrodes were formed on each sintered body as in Example I, providing 8 voltage nonlinear resistor as shown in Table 3 below.

The impulse current at breakdown was measured for each resistor as in Example I. The results are shown in Table 3.

the first side face high-resistance layer to form a side face high-resistance layer of 2-layer structure, it is possible to obtain a side face high-resistance layer exhibiting a far excellent insulating property as well as to remarkably improve the protective capability of voltage nonlinear resistor against the surge.

EXAMPLE IV

A bismuth glass powder composition containing 10 wt % of ZnO, 5 wt % of $B_2O_3$, 1.0 wt % of $SiO_2$, 1.0 wt % of $Al_2O_3$, 1.0 wt % of BaO and the balance of $Bi_2O_3$ was mixed with 10 wt % (based on the total weight of the glass powder composition) of cordierite ($Mg_2Al_4Si_5O_{18}$) filler. The mixture was mixed with water and an organic binder to prepare a slurry.

Then, the slurry was coated on the side face of a disk-shaped sintered body prepared as in Example I and baked to thereby form a side face high-resistance layer having a thickness of 1 μm, 10 μm, 100 μm, 500 μm, 700 μm or 1 mm.

Then, aluminum electrodes were formed as in Example I, thus providing 6 voltage nonlinear resistors.

The impulse current at breakdown of each resistor was measured as in Example I. The results are shown in FIG. 2.

Figure 2:
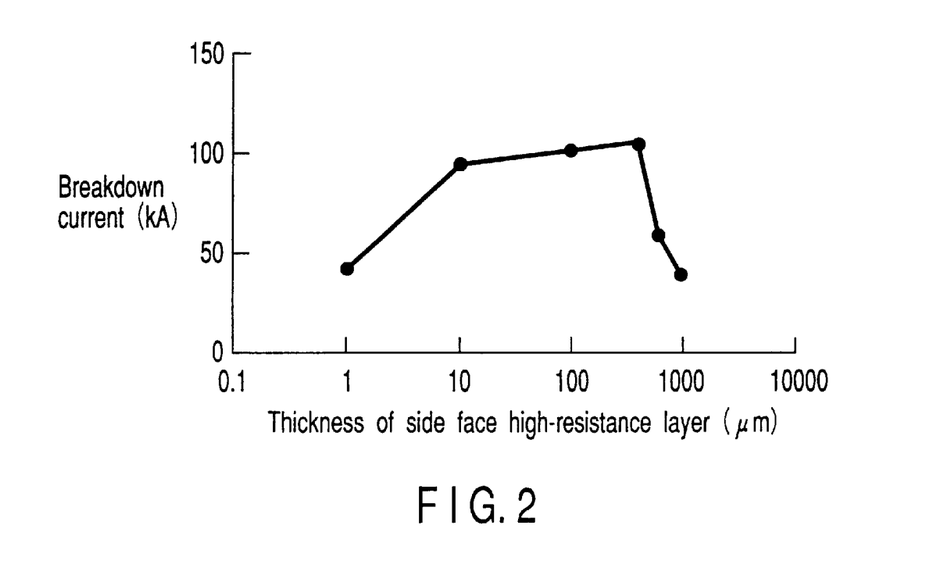
FIG. 2 is a graph illustrating a relationship between the thickness side face high-resistance layer and a breakdown current intensity (overvoltage protecting capability) in a voltage nonlinear resistor having a side face high-resistance layer comprising a bismuth glass and a filler according to Example IV.

As apparent from FIG. 2, the voltage nonlinear resistors provided with a side face high-resistance layer having a thickness of 10 μm, 100 μm or 500 μm exhibited an impulse current at breakdown of 95 kA to 105 kA, thus all indicating

TABLE 3

| Sample No. | First Side Face High-Resistance Layer | Second Side Face High-Resistance Layer | Impulse Current At Breakdown (kA) |
|---|---|---|---|
| 1 | Bi-Zn(10)-B(5)-Si(1)-Al(1)-Ba(1) | None | 85 |
| 2 | Bi-Zn(10)-B(5)-Si(1)-Al(1)-Ba(1) + Cordierite (10) | | 100 |
| 3 | Bi-Zn(10)-B(5)-Al(1)-Ba(1) | | 85 |
| 4 | Bi-Zn(10)-B(5)-Al(1)-Ba(1) + Cordierite (10) | | 100 |
| 5 | Zinc silicate + Zinc antimony spinel | Bi-Zn(10)-B(5)-Si(1)-Al(1)-Ba(1) | 100 |
| 6 | | Bi-Zn(10)-B(5)-Si(1)-Al(1)-Ba(1) + Cordierite (10) | 110 |
| 7 | | Bi-Zn(10)-B(5)-Al(1)-Ba(1) | 100 |
| 8 | | Bi-Zn(10)-B(5)-Al(1)-Ba(1) + Cordierite (10) | 110 |

Note: The numeral in the bracket indicates the contents (% by weight) in the case of the glass, and the added amount (% by weight) in the case of cordierite.

As apparent from Table 3, the voltage nonlinear resistors of sample Nos. 1–4, each having a single side face high-resistance layer corresponding to the Examples I and II exhibited an impulse current at breakdown of 80 kA to 100 kA. On the other hand, the voltage nonlinear resistors of sample Nos. 5–8 of Example III, each having a side face high-resistance layer of 2-layer structure, exhibited an impulse current at breakdown of 100 kA to 110 kA, thus all indicating an excellent impulse withstanding capability.

As explained above, it will be understood from Example III that since the first side face high-resistance layer consisting of a mixture comprising zinc silicate ($Zn_2SiO_4$) and zinc antimony spinel ($Zn_7Si_2O_{12}$) was formed in advance on the side face of a disk-shaped sintered body, and then, the second side face high-resistance layer consisting of the bismuth glass added with or without the filler was formed on an excellent impulse withstanding capability. On the other hand, the voltage nonlinear resistors provided with a side face high-resistance layers having a thickness of 1 μm or 1 mm exhibited an impulse current at breakdown of as low as 40 kA to 65 kA, thus all indicating an inferior impulse withstanding capability. This may be attributed to the fact that when the thickness of the side face high-resistance layer is too thin, it would become impossible to secure a satisfactory protective capability against the impulse current, and that when the thickness of the side face high-resistance layer is too thick, the adhesive strength of the side face high-resistance layer to the sintered body is caused to deteriorate, thereby making it impossible to secure a satisfactory protective capability against the impulse current.

As explained above, it will be understood from Example IV that when the thickness of the side face high-resistance layer is within the range of 10 to 500 μm, it becomes possible to secure both of excellent adhesive strength to the sintered body and excellent voltage withstanding properties, thus remarkably improving the protective capability of voltage nonlinear resistor against an impulse current.

EXAMPLE V

Voltage nonlinear resistor provided with a side face high-resistance layer having a thickness of 100 μm was manufactured, following the same procedures as in Example IV, except that the distance L between the outer peripheral edge 2a of the aluminum electrode 2 and the outer peripheral surface 3a of side face high-resistance layer 3 was set to 0 μm, 10 μm, 50 μm, 100 μm, 110 μm, 120 μm or 150 μm (see FIG. 1).

The impulse current at breakdown of each resistor was measured as in Example I. The results are shown in FIG. 3.

Figure 3:
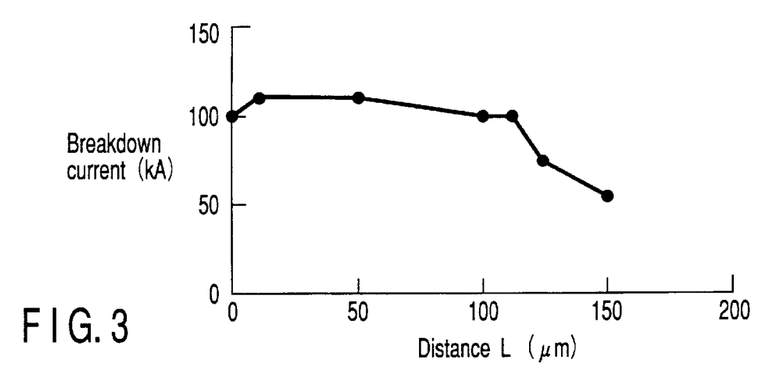
FIG. 3 is a graph illustrating a relationship between a breakdown voltage (overvoltage protecting capability) and changes in distance between the outer peripheral edge of electrode and the outer peripheral surface of side face high-resistance layer in a voltage nonlinear resistor having a side face high-resistance layer comprising a bismuth glass and a filler according to Example V.

As apparent from FIG. 3, the voltage nonlinear resistors provided with a side face high-resistance layer where the distance L between the outer peripheral edge 2a of the aluminum electrode 2 and the outer peripheral surface 3a of the side face high-resistance layer 3 was set to 0, 10 μm, 50 μm, 100 μm or 110 μm exhibited an impulse current at breakdown of 100 kA, thus all indicating an excellent impulse withstanding capability. On the other hand, the voltage nonlinear resistors where the distance L was set to 120 μm or 150 μm exhibited an impulse current at breakdown of as low as 60 kA to 75 kA, thus all indicating an inferior impulse withstanding capability. This may be attributed to the fact that if the distance L between the outer peripheral edge 2a of the aluminum electrode 2 and the outer peripheral surface 3a of the side face high-resistance layer 3 is too large, there may be generated, when an impulse current is impressed, a heated region due to the flow of electric current through the interior of the voltage nonlinear resistor where the electrodes are formed, and an un-heated region due to the non-existence of current flow at the electrode-free region on the outermost peripheral portion of the voltage nonlinear resistor, thus resulting in that a large thermal stress is caused to generate, and that cracks are caused to generate in the voltage nonlinear resistor. As a result, it would become impossible to secure a satisfactory protective capability against the impulse current.

As explained above, it will be understood from Example V that when the distance between the outer peripheral edge of a pair of electrodes attached to the opposite main surfaces of the sintered body mainly containing zinc oxide and the edge of the sintered body including the outer peripheral surface of the side face high-resistance layer is adjusted to fall within the range of: 0 to the thickness of side face high-resistance layer +0.01 mm, it becomes possible to bring about the generation of heat to a suitable extent as the impulse current is absorbed, thus making it possible to remarkably improve the protective capability of voltage nonlinear resistor against an impulse current.

EXAMPLE VI

Voltage nonlinear resistors were manufactured following the same procedures as in Example I, except that the components used to prepare side face high-resistance layers were as indicated in Tables 4–9 below.

The impulse current at breakdown of each resistor was measured as in Example I. Further, the $IR_{100h}/IR_{0h}$ ratio was determined as in Example I. The results are shown in Tables 4–9.

TABLE 4

| Sample No. | Glass Components (% by weight) (Balance: $Bi_2O_3$) | | | | | Filler (% by weight) | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 1 | 10 | 5 | 1 | 1 | 1 | β-eucryptite (0.1) | 85 | 0.94 |
| 2 | 10 | 5 | 1 | 1 | 1 | β-eucryptite (1) | 100 | 0.95 |
| 3 | 10 | 5 | 1 | 1 | 1 | β-eucryptite (10) | 105 | 0.93 |
| 4 | 10 | 5 | 1 | 1 | 1 | β-eucryptite (30) | 100 | 0.91 |
| 5 | 10 | 5 | 1 | 1 | 1 | β-eucryptite (40) | 65 | 1.37 |
| 6 | 10 | 5 | 1 | 1 | 1 | β-spodumene (0.1) | 85 | 0.96 |
| 7 | 10 | 5 | 1 | 1 | 1 | β-spodumene (1) | 100 | 0.91 |
| 8 | 10 | 5 | 1 | 1 | 1 | β-spodumene (10) | 105 | 0.93 |
| 9 | 10 | 5 | 1 | 1 | 1 | β-spodumene (30) | 105 | 0.95 |
| 10 | 10 | 5 | 1 | 1 | 1 | β-spodumene (40) | 60 | 1.28 |
| 11 | 10 | 5 | 1 | 1 | 1 | Petalite (0.1) | 90 | 0.97 |
| 12 | 10 | 5 | 1 | 1 | 1 | Petalite (1) | 100 | 0.96 |
| 13 | 10 | 5 | 1 | 1 | 1 | Petalite (10) | 100 | 0.96 |
| 14 | 10 | 5 | 1 | 1 | 1 | Petalite (30) | 100 | 0.94 |
| 15 | 10 | 5 | 1 | 1 | 1 | Petalite (40) | 55 | 1.41 |

TABLE 5

| Sample No. | Glass Components (% by weight) (Balance: $Bi_2O_3$) | | | | | Filler (% by weight) | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 16 | 10 | 5 | 1 | 1 | 1 | Zirconyl phosphate (0.1) | 85 | 0.94 |
| 17 | 10 | 5 | 1 | 1 | 1 | Zirconyl phosphate (1) | 100 | 0.93 |
| 18 | 10 | 5 | 1 | 1 | 1 | Zirconyl phosphate (10) | 110 | 0.98 |
| 19 | 10 | 5 | 1 | 1 | 1 | Zirconyl phosphate (30) | 105 | 0.97 |
| 20 | 10 | 5 | 1 | 1 | 1 | Zirconyl phosphate (40) | 65 | 1.35 |

TABLE 5-continued

| Sample No. | Glass Components (% by weight) (Balance: $Bi_2O_3$) | | | | | Filler (% by weight) | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 21 | 10 | 5 | 1 | 1 | 1 | Alumina (0.1) | 85 | 0.94 |
| 22 | 10 | 5 | 1 | 1 | 1 | Alumina (1) | 100 | 0.96 |
| 23 | 10 | 5 | 1 | 1 | 1 | Alumina (10) | 105 | 0.95 |
| 24 | 10 | 5 | 1 | 1 | 1 | Alumina (30) | 100 | 0.93 |
| 25 | 10 | 5 | 1 | 1 | 1 | Alumina (40) | 50 | 1.55 |

TABLE 6

| Sample No. | Glass Components (% by weight) (Balance: $Bi_2O_3$) | | | | | Filler (% by weight) | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 26 | 10 | 5 | 1 | 1 | 1 | Potash feldspar (0.1) | 90 | 0.96 |
| 27 | 10 | 5 | 1 | 1 | 1 | Potash feldspar (1) | 105 | 0.95 |
| 28 | 10 | 5 | 1 | 1 | 1 | Potash feldspar (10) | 105 | 0.97 |
| 29 | 10 | 5 | 1 | 1 | 1 | Potash feldspar (30) | 110 | 0.98 |
| 30 | 10 | 5 | 1 | 1 | 1 | Potash feldspar (40) | 65 | 1.21 |
| 31 | 10 | 5 | 1 | 1 | 1 | Soda feldspar (0.1) | 85 | 0.94 |
| 32 | 10 | 5 | 1 | 1 | 1 | Soda feldspar (1) | 100 | 0.92 |
| 33 | 10 | 5 | 1 | 1 | 1 | Soda feldspar (10) | 110 | 0.95 |
| 34 | 10 | 5 | 1 | 1 | 1 | Soda feldspar (30) | 105 | 0.93 |
| 35 | 10 | 5 | 1 | 1 | 1 | Soda feldspar (40) | 60 | 1.33 |

TABLE 7

| Sample No. | Glass Components (% by weight) (Balance: $Bi_2O_3$) | | | | | Filler (% by weight) | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 36 | 10 | 5 | 1 | 1 | 1 | Kaolin (0.1) | 95 | 0.94 |
| 37 | 10 | 5 | 1 | 1 | 1 | Kaolin (1) | 110 | 0.96 |
| 38 | 10 | 5 | 1 | 1 | 1 | Kaolin (10) | 110 | 0.97 |
| 39 | 10 | 5 | 1 | 1 | 1 | Kaolin (30) | 105 | 0.95 |
| 40 | 10 | 5 | 1 | 1 | 1 | Kaolin (40) | 65 | 1.23 |
| 41 | 10 | 5 | 1 | 1 | 1 | Sericite (0.1) | 90 | 0.92 |
| 42 | 10 | 5 | 1 | 1 | 1 | Sericite (1) | 100 | 0.95 |
| 43 | 10 | 5 | 1 | 1 | 1 | Sericite (10) | 105 | 0.93 |
| 44 | 10 | 5 | 1 | 1 | 1 | Sericite (30) | 105 | 0.94 |
| 45 | 10 | 5 | 1 | 1 | 1 | Sericite (40) | 60 | 1.26 |
| 46 | 10 | 5 | 1 | 1 | 1 | Silica (0.1) | 95 | 0.94 |
| 47 | 10 | 5 | 1 | 1 | 1 | Silica (1) | 105 | 0.98 |
| 48 | 10 | 5 | 1 | 1 | 1 | Silica (10) | 110 | 0.97 |
| 49 | 10 | 5 | 1 | 1 | 1 | Silica (30) | 105 | 0.98 |
| 50 | 10 | 5 | 1 | 1 | 1 | Silica (40) | 65 | 1.39 |

TABLE 8

| Sample No. | Glass Components (% by weight) (Balance: $Bi_2O_3$) | | | | | Filler (% by weight) | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 51 | 10 | 5 | 1 | 1 | 1 | Alumina (0.05) + Silica (0.05) | 85 | 0.93 |
| 52 | 10 | 5 | 1 | 1 | 1 | Alumina (0.5) + Silica (0.5) | 105 | 0.94 |
| 53 | 10 | 5 | 1 | 1 | 1 | Alumina (5) + Silica (5) | 100 | 0.95 |
| 54 | 10 | 5 | 1 | 1 | 1 | Alumina (15) + Silica (15) | 105 | 0.92 |
| 55 | 10 | 5 | 1 | 1 | 1 | Alumina (20) + Silica (20) | 55 | 1.33 |
| 56 | 10 | 5 | 1 | 1 | 1 | Cordierite (0.05) + Potash feldspar (0.05) | 95 | 0.96 |
| 57 | 10 | 5 | 1 | 1 | 1 | Cordierite (0.5) + Potash feldspar (0.5) | 105 | 0.94 |
| 58 | 10 | 5 | 1 | 1 | 1 | Cordierite (5) + Potash feldspar (5) | 110 | 0.94 |

TABLE 8-continued

| Sample No. | Glass Components (% by weight) (Balance: $Bi_2O_3$) | | | | | Filler (% by weight) | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 59 | 10 | 5 | 1 | 1 | 1 | Cordierite (15) + Potash feldspar (15) | 110 | 0.95 |
| 60 | 10 | 5 | 1 | 1 | 1 | Cordierite (20) + Potash feldspar (20) | 65 | 1.29 |

TABLE 9

| Sample No. | Glass Components (% by weight) (Balance: $Bi_2O_3$) | | | | | Filler (% by weight) | Impulse Current At Breakdown (kA) | $IR_{100h}/IR_{0h}$ |
|---|---|---|---|---|---|---|---|---|
| | ZnO | $B_2O_3$ | $SiO_2$ | $Al_2O_3$ | BaO | | | |
| 61 | 10 | 5 | 1 | 1 | 1 | Cordierite (0.05) + Kaolin (0.05) | 95 | 0.97 |
| 62 | 10 | 5 | 1 | 1 | 1 | Cordierite (0.5) + Kaolin (0.5) | 110 | 0.96 |
| 63 | 10 | 5 | 1 | 1 | 1 | Cordierite (5) + Kaolin (5) | 110 | 0.96 |
| 64 | 10 | 5 | 1 | 1 | 1 | Cordierite (15) + Kaolin (15) | 110 | 0.98 |
| 65 | 10 | 5 | 1 | 1 | 1 | Cordierite (20) + Kaolin (20) | 65 | 1.29 |
| 66 | 10 | 5 | 1 | 1 | 1 | Zirconyl phosphate (0.05) + Silica (0.05) | 85 | 0.91 |
| 67 | 10 | 5 | 1 | 1 | 1 | Zirconyl phosphate (0.5) + Silica (0.5) | 100 | 0.93 |
| 68 | 10 | 5 | 1 | 1 | 1 | Zirconyl phosphate (5) + Silica (5) | 100 | 0.92 |
| 69 | 10 | 5 | 1 | 1 | 1 | Zirconyl phosphate (15) + Silica (15) | 105 | 0.9 |
| 70 | 10 | 5 | 1 | 1 | 1 | Zirconyl phosphate (20) + Silica (20) | 550 | 1.43 |

As apparent from Tables 4–9, the voltage nonlinear resistors of sample Nos. 2–4, 7–9, 12–14, 17–19, 22–24, 27–29, 32–34, 37–39, 42–44, 47–49, 52–54, 57–59, 62–64 and 67–69 according to the present invention wherein the side face high-resistance layers thereof were formed of a bismuth glass containing, as a main component, Bi in terms of its oxide and, as subsidiary components, Zn, B, Si, Al and Ba in terms of their oxides each falling within the ranges of: ZnO=1.0–25 wt %; $B_2O_3$=1.0–10 wt %; $SiO_2$=0.1–5 wt %; $Al_2O_3$ 0.05–3 wt %; and BaO=0.05–3 wt %, added with 1–30 wt % (based on the total weight of the bismuth glass) of at least one filler selected from the group consisting of β-eucryptite, β-spodumene, petalite, zirconyl phosphate, alumina, potash feldspar, soda feldspar, kaolin, sericite and silica were found excellent in applied-voltage life characteristic in view of the $IR_{100h}/IR_{0h}$ ratio of 0.9 to 1.0. Furthermore, in these voltage nonlinear resistors, the impulse current at breakdown was as high as 100 kA or more, which was higher than that of the voltage nonlinear resistor having the filler-free side face high-resistance layer of Example I, thus all indicating a further excellent impulse withstanding capability.

However, the voltage nonlinear resistors of sample Nos. 1, 6, 11, 16, 21, 26, 31, 36, 41, 46, 51, 56, 61 and 66, wherein the side face high-resistance layers thereof were formed employing less than 1% by weight of the filler, were found almost the same as the voltage nonlinear resistor having a filler-free side face high-resistance layer, with respect to the $IR_{100h}/IR_{0h}$ ratio and the impulse current at breakdown.

On the other hand, the voltage nonlinear resistors of sample Nos. 5, 10, 15, 20, 25, 30, 35, 40, 45, 50, 55, 60, 65 and 70, wherein the side face high-resistance layers thereof were formed employing more than 30% by weight of the filler, were found poor in applied-voltage life characteristic in view of the $IR_{100h}/IR_{0h}$ ratio ≧1.0. Furthermore, in these voltage nonlinear resistors, the impulse current at breakdown was as low as 55 kA to 65 kA, thus all indicating an inferior impulse withstanding capability.

As explained above, it will be understood from Example VI that since the side face high-resistance layer which was formed of a bismuth glass containing, as a main component, Bi in terms of its oxide and, as subsidiary components, Zn, B, Si, and Ba in terms of their oxides each falling within the ranges of: ZnO=1.0–25 wt %; $B_2O_3$=1.0–10 wt %; $SiO_2$= 0.1–5 wt %; $Al_2O_3$=0.05–3 wt %; and BaO=0.05–3 wt %, added with 1–30 wt % (based on the total weight of the bismuth glass) of at least one filler selected from the group consisting of β-eucryptite, β-spodumene, petalite, zirconyl phosphate, alumina, potash feldspar, soda feldspar, kaolin, sericite and silica, it was possible to obtain a voltage nonlinear resistor, which was excellent in current-voltage characteristic as well as in applied-voltage life characteristic. Furthermore, since the thermal expansion coefficient of the side face high-resistance layer was close to that of the sintered body, and at the same time, since the adhesive strength of the side face high-resistance layer to the sintered body was strong, it was possible to realize a voltage nonlinear resistor exhibiting a high energy absorption capability.

Further, since the side face high-resistance layer can be formed on a sintered body at such a low baking temperature which would not allow components of the side face high-resistance layer to permeate into the sintered body or which would not cause any change in the crystal structure of the sintered body, it would be possible to obtain a voltage nonlinear resistor which is excellent in current-voltage characteristic as well as in applied-voltage life characteristic. Furthermore, since the thermal expansion coefficient of the side face high-resistance layer is close to that of the sintered body, and at the same time, since the adhesive strength of the side face high-resistance layer to the sintered body is strong, it would be possible to realize a voltage nonlinear resistor exhibiting a high energy absorption capability.

EXAMPLE VII

Voltage nonlinear resistors were manufactured following the same procedures as in Example I, except that the components used to prepare side face high-resistance layers were as indicated in Tables 10–15 below.

The impulse current at breakdown of each resistor was measured as in Example I. Further, the ratio $IR_{100h}/IR_{0h}$ was determined as in Example I. The results are shown in Tables 10–15.

TABLE 10

| Sample No. | Glass Components (% by weight) (Balance: $Bi_2O_3$) | | | | Filler (% by weight) | Impulse Current At Breakdown (kA) | $IR_{100h}/IR_{0h}$ |
|---|---|---|---|---|---|---|---|
| | ZnO | $B_2O_3$ | $Al_2O_3$ | BaO | | | |
| 1 | 10 | 5 | 1 | 1 | β-eucryptite (0.1) | 85 | 0.89 |
| 2 | 10 | 5 | 1 | 1 | β-eucryptite (1) | 100 | 0.86 |
| 3 | 10 | 5 | 1 | 1 | β-eucryptite (10) | 105 | 0.84 |
| 4 | 10 | 5 | 1 | 1 | β-eucryptite (30) | 100 | 0.85 |
| 5 | 10 | 5 | 1 | 1 | β-eucryptite (40) | 60 | 1.39 |
| 6 | 10 | 5 | 1 | 1 | β-spodumene (0.1) | 85 | 0.88 |
| 7 | 10 | 5 | 1 | 1 | β-spodumene (1) | 105 | 0.86 |
| 8 | 10 | 5 | 1 | 1 | β-spodumene (10) | 105 | 0.85 |
| 9 | 10 | 5 | 1 | 1 | β-spodumene (30) | 100 | 0.86 |
| 10 | 10 | 5 | 1 | 1 | β-spodumene (40) | 65 | 1.36 |
| 11 | 10 | 5 | 1 | 1 | Petalite (0.1) | 90 | 0.86 |
| 12 | 10 | 5 | 1 | 1 | Petalite (1) | 100 | 0.84 |
| 13 | 10 | 5 | 1 | 1 | Petalite (10) | 105 | 0.83 |
| 14 | 10 | 5 | 1 | 1 | Petalite (30) | 100 | 0.85 |
| 15 | 10 | 5 | 1 | 1 | Petalite (40) | 55 | 1.41 |

TABLE 11

| Sample No. | Glass Components (% by weight) (Balance: $Bi_2O_3$) | | | | Filler (% by weight) | Impulse Current At Breakdown (kA) | $IR_{100h}/IR_{0h}$ |
|---|---|---|---|---|---|---|---|
| | ZnO | $B_2O_3$ | $Al_2O_3$ | BaO | | | |
| 16 | 10 | 5 | 1 | 1 | Zirconyl phosphate (0.1) | 85 | 0.91 |
| 17 | 10 | 5 | 1 | 1 | Zirconyl phosphate (1) | 105 | 0.88 |
| 18 | 10 | 5 | 1 | 1 | Zirconyl phosphate (10) | 105 | 0.86 |
| 19 | 10 | 5 | 1 | 1 | Zirconyl phosphate (30) | 105 | 0.89 |
| 20 | 10 | 5 | 1 | 1 | Zirconyl phosphate (40) | 60 | 1.37 |
| 21 | 10 | 5 | 1 | 1 | Alumina (0.1) | 85 | 0.93 |
| 22 | 10 | 5 | 1 | 1 | Alumina (1) | 100 | 0.90 |
| 23 | 10 | 5 | 1 | 1 | Alumina (10) | 100 | 0.87 |
| 24 | 10 | 5 | 1 | 1 | Alumina (30) | 100 | 0.91 |
| 25 | 10 | 5 | 1 | 1 | Alumina (40) | 55 | 1.52 |

TABLE 12

| Sample No. | Glass Components (% by weight) (Balance: $Bi_2O_3$) | | | | Filler (% by weight) | Impulse Current At Breakdown (kA) | $IR_{100h}/IR_{0h}$ |
|---|---|---|---|---|---|---|---|
| | ZnO | $B_2O_3$ | $Al_2O_3$ | BaO | | | |
| 26 | 10 | 5 | 1 | 1 | Potash feldspar (0.1) | 90 | 0.82 |
| 27 | 10 | 5 | 1 | 1 | Potash feldspar (1) | 105 | 0.81 |
| 28 | 10 | 5 | 1 | 1 | Potash feldspar (10) | 110 | 0.83 |
| 29 | 10 | 5 | 1 | 1 | Potash feldspar (30) | 110 | 0.82 |
| 30 | 10 | 5 | 1 | 1 | Potash feldspar (40) | 65 | 1.22 |
| 31 | 10 | 5 | 1 | 1 | Soda feldspar (0.1) | 90 | 0.86 |
| 32 | 10 | 5 | 1 | 1 | Soda feldspar (1) | 105 | 0.84 |
| 33 | 10 | 5 | 1 | 1 | Soda feldspar (10) | 105 | 0.82 |
| 34 | 10 | 5 | 1 | 1 | Soda feldspar (30) | 100 | 0.85 |
| 35 | 10 | 5 | 1 | 1 | Soda feldspar (40) | 60 | 1.27 |

TABLE 13

| Sample No. | Glass Components (% by weight) (Balance: $Bi_2O_3$) | | | | Filler (% by weight) | Impulse Current At Breakdown (kA) | $IR_{100h}/IR_{0h}$ |
|---|---|---|---|---|---|---|---|
| | ZnO | $B_2O_3$ | $Al_2O_3$ | BaO | | | |
| 36 | 10 | 5 | 1 | 1 | Kaolin (0.1) | 85 | 0.80 |
| 37 | 10 | 5 | 1 | 1 | Kaolin (1) | 110 | 0.81 |
| 38 | 10 | 5 | 1 | 1 | Kaolin (10) | 110 | 0.82 |
| 39 | 10 | 5 | 1 | 1 | Kaolin (30) | 110 | 0.82 |
| 40 | 10 | 5 | 1 | 1 | Kaolin (40) | 65 | 1.19 |
| 41 | 10 | 5 | 1 | 1 | Sericite (0.1) | 90 | 0.85 |

TABLE 13-continued

| Sample No. | Glass Components (% by weight) (Balance: Bi$_2$O$_3$) | | | | Filler (% by weight) | Impulse Current At Breakdown (kA) | IR$_{100h}$/IR$_{0h}$ |
|---|---|---|---|---|---|---|---|
| | ZnO | B$_2$O$_3$ | Al$_2$O$_3$ | BaO | | | |
| 42 | 10 | 5 | 1 | 1 | Sericite (1) | 105 | 0.83 |
| 43 | 10 | 5 | 1 | 1 | Sericite (10) | 110 | 0.85 |
| 44 | 10 | 5 | 1 | 1 | Sericite (30) | 105 | 0.87 |
| 45 | 10 | 5 | 1 | 1 | Sericite (40) | 60 | 1.24 |
| 46 | 10 | 5 | 1 | 1 | Silica (0.1) | 90 | 0.85 |
| 47 | 10 | 5 | 1 | 1 | Silica (1) | 105 | 0.83 |
| 48 | 10 | 5 | 1 | 1 | Silica (10) | 110 | 0.81 |
| 49 | 10 | 5 | 1 | 1 | Silica (30) | 110 | 0.84 |
| 50 | 10 | 5 | 1 | 1 | Silica (40) | 65 | 1.19 | the total weight of the bismuth glass) of at least one filler selected from the group consisting of β-eucryptite, β-spodumene, petalite, zirconyl phosphate, alumina, potash feldspar, soda feldspar, kaolin, sericite and silica were found excellent in applied-voltage life characteristic in view of the IR$_{100h}$/IR$_{0h}$ ratio of 0.8 to 0.9. Furthermore, in these voltage nonlinear resistors, the impulse current at breakdown was as high as 100 kA or more, which was higher than that of the voltage nonlinear resistor having the filler-free side face high-resistance layer of Example I, thus all indicating a further excellent impulse withstanding capability.

However, the voltage nonlinear resistors of sample Nos. 1, 6, 11, 16, 21, 26, 31, 36, 41, 46, 51, 56, 61 and 66, wherein the side face high-resistance layers were formed employing less than 1% by weight of the filler, were found almost the same as the voltage nonlinear resistor having a filler- side face high-resistance layer, with respect to the IR$_{100h}$/IR$_{0h}$ ratio and the impulse current at breakdown.

On the other hand, the voltage nonlinear resistors of sample Nos. 5, 10, 15, 20, 25, 30, 35, 40, 45, 50, 55, 60, 65 and 70, wherein the side face high-resistance layers were formed employing more than 30% by weight of the filler, were found poor in applied-voltage life characteristic in view of the IR$_{100h}$/IR$_{0h}$ ratio ≧1.0. Furthermore, in these

TABLE 14

| Sample No. | Glass Components (% by weight) (Balance: Bi$_2$O$_3$) | | | | Filler (% by weight) | Impulse Current At Breakdown (kA) | IR$_{100h}$/IR$_{0h}$ |
|---|---|---|---|---|---|---|---|
| | ZnO | B$_2$O$_3$ | Al$_2$O$_3$ | BaO | | | |
| 51 | 10 | 5 | 1 | 1 | Alumina (0.05) + Silica (0.05) | 85 | 0.89 |
| 52 | 10 | 5 | 1 | 1 | Alumina (0.5) + Silica (0.5) | 105 | 0.88 |
| 53 | 10 | 5 | 1 | 1 | Alumina (5) + Silica (5) | 100 | 0.91 |
| 54 | 10 | 5 | 1 | 1 | Alumina (15) + Silica (15) | 105 | 0.87 |
| 55 | 10 | 5 | 1 | 1 | Alumina (20) + Silica (20) | 60 | 1.22 |
| 56 | 10 | 5 | 1 | 1 | Cordierite (0.05) + Potash feldspar (0.05) | 95 | 0.85 |
| 57 | 10 | 5 | 1 | 1 | Cordierite (0.5) + Potash feldspar (0.5) | 110 | 0.83 |
| 58 | 10 | 5 | 1 | 1 | Cordierite (5) + Potash feldspar (5) | 110 | 0.84 |
| 59 | 10 | 5 | 1 | 1 | Cordierite (15) + Potash feldspar (15) | 105 | 0.86 |
| 60 | 10 | 5 | 1 | 1 | Cordierite (20) + Potash feldspar (20) | 65 | 1.17 |

TABLE 15

| Sample No. | Glass Components (% by weight) (Balance: Bi$_2$O$_3$) | | | | Filler (% by weight) | Impulse Current At Breakdown (kA) | IR$_{100h}$/IR$_{0h}$ |
|---|---|---|---|---|---|---|---|
| | ZnO | B$_2$O$_3$ | Al$_2$O$_3$ | BaO | | | |
| 61 | 10 | 5 | 1 | 1 | Cordierite (0.05) + Kaolin (0.05) | 95 | 0.81 |
| 62 | 10 | 5 | 1 | 1 | Cordierite (0.5) + Kaolin (0.5) | 110 | 0.83 |
| 63 | 10 | 5 | 1 | 1 | Cordierite (5) + Kaolin (5) | 110 | 0.82 |
| 64 | 10 | 5 | 1 | 1 | Cordierite (15) + Kaolin (15) | 110 | 0.83 |
| 65 | 10 | 5 | 1 | 1 | Cordierite (20) + Kaolin (20) | 65 | 1.15 |
| 66 | 10 | 5 | 1 | 1 | Zirconyl phosphate (0.05) + Silica (0.05) | 85 | 0.93 |
| 67 | 10 | 5 | 1 | 1 | Zirconyl phosphate (0.5) + Silica (0.5) | 100 | 0.94 |
| 68 | 10 | 5 | 1 | 1 | Zirconyl phosphate (5) + Silica (5) | 100 | 0.93 |
| 69 | 10 | 5 | 1 | 1 | Zirconyl phosphate (15) + Silica (15) | 105 | 0.91 |
| 70 | 10 | 5 | 1 | 1 | Zirconyl phosphate (20) + Silica (20) | 60 | 1.28 |

As apparent from Tables 10–15, the voltage nonlinear resistors of sample Nos. 2–4, 7–9, 12–14, 17–19, 22–24, 27–29, 32–34, 37–39, 42–44, 47–49, 52–54, 57–59, 62–64 and 67–69 according to the present invention, wherein the side face high-resistance layers were formed of a bismuth glass containing, as a main component, Bi in terms of its oxide and, as subsidiary components, Zn, B, Al and Ba in terms of their oxides each falling within the ranges of: ZnO=1.0–25 wt %; B$_2$O$_3$=1.0–10 wt %; Al$_2$O$_3$=0.05–3 wt %; and BaO=0.05–3 wt %, added with 1–30 wt % (based on voltage nonlinear resistors, the impulse current at breakdown was as low as 60 kA to 65 kA, thus all indicating an inferior impulse withstanding capability.

As explained above, it will be understood from Example VII that since the side face high-resistance layer which was formed of a bismuth glass containing, as a main component, Bi in terms of its oxide and, as subsidiary components, Zn, B, Al and Ba in terms of their oxides falling within the ranges of: ZnO 1.0–25 wt %; B$_2$O$_3$=1.0–10 wt %; Al$_2$O$_3$= 0.05–3 wt %; and BaO=0.05–3 wt %, added with 1–30 wt % (based on the total weight of the bismuth glass) of at least one filler selected from the group consisting of β-eucryptite, β-spodumene, petalite, zirconyl phosphate, alumina, potash feldspar, soda feldspar, kaolin, sericite and silica can be formed on a sintered body containing zinc oxide as a main component at such a low baking temperature which would not allow components of the side face high-resistance layer to permeate into the sintered body or which would not cause any change in the crystal structure of the sintered body, it would be possible to obtain a voltage nonlinear resistor which is excellent in current-voltage characteristic as well as in applied-voltage life characteristic. Furthermore, since the thermal expansion coefficient of the side face high-resistance layer is close to that of the aforementioned sintered body, and at the same time, since the adhesive strength of the side face high-resistance layer to the sintered body is strong, it would be possible to realize a voltage nonlinear resistor exhibiting a high energy absorption capability.

EXAMPLE VIII

Voltage nonlinear resistors were manufactured following the same procedures as in Example I, except that the bismuth glass powder used to prepare the side face high-resistance layer had an average particle diameter of 0.1 μm, 0.5 μm, 1.0 μm, 10 μm, 30 μm, 60 μm or 100 μm and was comprised of 10 wt % of ZnO, 5 wt % of $B_2O_3$, 1.0 wt % of $SiO_2$, 1.0 wt % of $Al_2O_3$, 1.0 wt % of BaO and the balance of $Bi_2O_3$. The side face high-resistance layer was formed to have a thickness of 100 μm.

The impulse current at breakdown of each resistor was measured as in Example I. The results are shown in FIG. 4.

Figure 4:
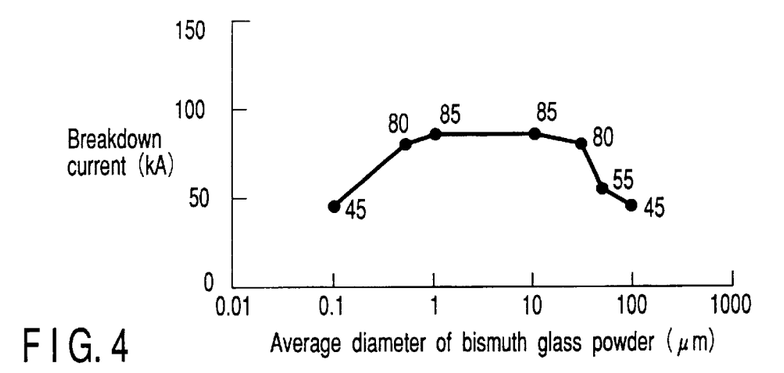
FIG. 4 is a graph illustrating a relationship between a breakdown voltage (overvoltage protecting capability) and changes in average particle diameter of a bismuth glass on the occasion of manufacturing a voltage nonlinear resistor by forming a side face high-resistance layer comprising the bismuth glass and the filler on a side face of the sintered body of the voltage nonlinear resistor according to Example VIII.

As apparent from FIG. 4, the voltage nonlinear resistors provided with a side face high-resistance layer formed with a slurry containing bismuth glass powder having an average particle diameter of 0.5 μm, 1.0 μm, 10 μm or 30 μm exhibited an impulse current at breakdown of 80 kA to 85 kA, thus all indicating an excellent impulse withstanding capability. On the other hand, the voltage nonlinear resistors provided with a side face high-resistance layer formed with a slurry containing bismuth glass powder having an average particle diameter of 60 μm or 100 μm exhibited an impulse current at breakdown of 45 kA to 55 kA, thus all indicating an inferior impulse withstanding capability.

As explained above, it will be understood from Example VIII that when the bismuth glass powder for forming the slurry has an average particle diameter of 0.5 to 30 μm, it becomes possible to secure both of excellent adhesive strength to the sintered body and excellent voltage withstanding properties, thus remarkably improving the protective capability of voltage nonlinear resistor against an impulse current.

EXAMPLE IX

Voltage nonlinear resistors were manufactured following the same procedures as in Example I, except that the bismuth glass powder used to prepare the side face high-resistance layer had an average particle diameter of 1.0 μm and was comprised of 10 wt % of ZnO, 5 wt % of $B_2O_3$, 1.0 wt % of $SiO_2$, 1.0 wt % of $Al_2O_3$, 1.0 wt % of BaO and the balance of $Bi_2O_3$ which was added with 10 wt % (based on the total weight of the glass powder) of cordierite ($Mg_2Al_4Si_5O_{18}$) filler having an average particle diameter of 0.1 μm, 0.8 μm, 1.0 μm, 10 μm, 30 μm, 60 μm or 100 am. The side face high-resistance layer was formed to have a thickness of 100 μm.

The impulse current at breakdown of each resistor was measured as in Example I. The results are shown in FIG. 5.

Figure 5:
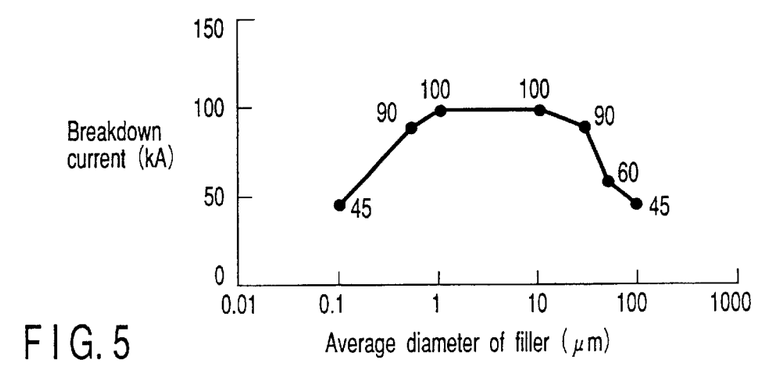
FIG. 5 is a graph illustrating a relationship between a breakdown voltage (overvoltage protecting capability) and changes in average particle diameter of a filler on the occasion of manufacturing a voltage nonlinear resistor by forming a side face high-resistance layer side face high-resistance layer comprising a bismuth glass and the filler on a side face of the sintered body of the voltage nonlinear resistor according to Example IX.

As apparent from FIG. 5, the voltage nonlinear resistors provided with a side face high-resistance layer formed with a slurry containing bismuth glass powder which was mixed with cordierite ($Mg_2Al_4Si_5O_{18}$) filler having an average particle diameter of 0.8 μm, 1.0 μm, 10 μm or 30 μm exhibited an impulse current at breakdown of 90 kA to 100 kA, thus all indicating an excellent impulse withstanding capability. On the other hand, the voltage nonlinear resistors provided with a side face high-resistance layer formed with a slurry containing bismuth glass powder which was mixed with cordierite ($Mg_2Al_4Si_5O_{18}$) filler having an average particle diameter of 60 μm or 100 μm exhibited an impulse current at breakdown of as low as 45 kA to 60 kA, thus all indicating an inferior impulse withstanding capability.

As explained above, it will be understood from Example IV that when the cordierite ($Mg_2Al_4Si_5O_{18}$) filler for forming the slurry has an average particle diameter of 0.5 to 30 μm, it becomes possible to secure both of excellent adhesive strength to the sintered body and excellent voltage withstanding properties, thus remarkably improving the protective capability of voltage nonlinear resistor against an impulse current.

EXAMPLE X

Bismuth glass powder composed of 10 wt % of ZnO, 5 wt % of $B_2O_3$, 1.0 wt % of $SiO_2$, 1.0 wt % of $Al_2O_3$, 1.0 wt % of BaO and the balance of $B_2O_3$ was mixed with 10 wt % (based on the total weight of the glass powder) of cordierite ($Mg_2Al_4Si_5O_{18}$) filler. The mixture was further mixed with an aqueous solution of polyvinyl alcohol binder, an aqueous solution of cellulosic binder, an aqueous solution of water-soluble acrylic binder or a solution of ethyl cellulose in terpineol, thus preparing five slurries.

Then, these slurries were respectively coated on the side face of a disk-shaped sintered body prepared as in Example I and baked to form side face high-resistance layers, each having a thickness of 100 μm. Thereafter, aluminum electrodes were formed as in Example I, thus providing 5 voltage nonlinear resistors.

The impulse current at breakdown of each resistor was measured as in Example I. The results are shown in Table 16 below.

TABLE 16

| Sample No. | Solution for the preparation of slurry | Impulse Current At Breakdown (kA) |
| --- | --- | --- |
| 1 | Aqueous solution of polyvinyl alcohol binder | 80 |
| 2 | Aqueous solution of cellulosic binder | 85 |
| 3 | Aqueous solution of water-soluble acrylic binder | 85 |
| 4 | Solution of ethyl cellulose in terpineol | 80 |
| 5 | Water | 20 |

As apparent from Table 16, the voltage nonlinear resistors provided with a side face high-resistance layer formed using a slurry containing an aqueous solution of polyvinyl alcohol binder, an aqueous solution of cellulosic binder, an aqueous solution of water-soluble acrylic binder or a solution of ethyl cellulose in terpineol exhibited an impulse current at breakdown of 80 kA to 85 kA, thus all indicating an excellent impulse withstanding capability. On the other hand, the voltage nonlinear resistors provided with a side face high-resistance layer formed with a mixed slurry containing water without including the aforementioned binder exhibited an impulse current at breakdown of as low as 20 kA, thus all indicating an inferior impulse withstanding capability.

As explained above, it will be understood from Example IX that when a slurry containing a specific kind of binder solution is employed on the occasion of forming the side face high-resistance layer, it becomes possible to secure both of excellent adhesive strength to the sintered body and excellent voltage withstanding properties, thus remarkably improving the protective capability of voltage nonlinear resistor against an impulse current.

As explained above, the side face high-resistance of the invention is formed of a bismuth glass composition, which may be added with a specified filler, that may be baked to be vitrified at such a low temperature as not to deteriorate the electric properties and applied-voltage life characteristic of the voltage nonlinear resistor, that can exhibit a thermal expansion coefficient which is close to that of the sintered body of voltage nonlinear resistor, that can exhibit an excellent adhesive strength, and/or that can exhibit an excellent voltage withstanding property. Thus, a voltage nonlinear resistor according to the invention can exhibit an excellent applied-voltage characteristic, an excellent applied voltage life characteristic, and/or an improved protecting capability to resist against a surge such as thunderbolt impulse or overvoltage. Further, the side face high-resistance layer of the invention is excellent in waterproofness so that even if it is applied to an overvoltage protection device provided with a polymer container, a stabilized electric property thereof can be sustained. Moreover, according to the voltage nonlinear resistor of the present invention, it would not cause environmental problems when manufacturing the voltage nonlinear resistor or scrapping the voltage nonlinear resistor after use.

Additionally, it is possible according to the present invention to provide a method of manufacturing a voltage nonlinear resistor having such excellent properties as explained above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A voltage nonlinear resistor comprising: a voltage nonlinear resistive body comprising zinc oxide; and a side face high-resistance layer provided on the side face of the resistive body, the high-resistance layer containing zinc in an amount of 1.0 to 25% by weigh in terms of its oxide (ZnO), boron in an amount of 1.0 to 10% by weight in terms of its oxide ($B_2O_3$), silicon in an amount of 0.1 to 5% by weight in terms of its oxide ($SiO_2$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$).

2. The resistor according to claim 1, wherein said high-resistance layer has a thickness of 10 $\mu$m to 500 $\mu$m.

3. The resistor according to claim 1, further comprising electrodes formed on main surfaces of the resistive body opposed to each other, respectively, and each electrode is formed such that a distance between an outer peripheral edge of the electrode and an outer peripheral surface the side face high-resistance layer is from 0 to the total of the thickness of the high-resistance layer +0.01 mm.

4. The resistor according to claim 1, comprising another side face high-resistance layer provided beneath said side face high-resistance layer defined in claim 1, said another side face high-resistance layer comprising zinc silicate and zinc antimony spinel.

5. A voltage nonlinear resistor comprising a voltage nonlinear resistive body comprising zinc oxide; and a side face high-resistance layer provided on the side face of the resistive body, the high-resistance layer containing zinc in an amount of 1.0 to 25% by weigh in terms of its oxide (ZnO), boron in an amount of 1.0 to 10% by weight in terms of its oxide ($B_2O_3$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$).

6. The resistor according to claim 5, wherein said high-resistance layer has a thickness of 10 $\mu$m to 500 $\mu$m.

7. The resistor according to claim 5, further comprising electrodes formed on main surfaces of the resistive body opposed to each other, respectively, and each electrode is formed such that a distance between an outer peripheral edge of the electrode and an outer peripheral surface the side face high-resistance layer is from 0 to the total of the thickness of the high-resistance layer +0.01 mm.

8. The resistor according to claim 5, comprising another side face high-resistance layer provided beneath said side face high-resistance layer defined in claim 5, said another side face high-resistance layer comprising zinc silicate and zinc antimony spinel.

9. A voltage nonlinear resistor comprising a voltage nonlinear resistive body comprising zinc oxide; and a side face high-resistance layer provided on the side face of the resistive body, the high-resistance layer comprising a glass composition containing zinc in an amount of 1.0 to 25% by weigh in terms of its oxide (ZnO), boron in an amount of 1.0 to 10% by weight in terms of its oxide ($B_2O_3$), silicon in an amount of 0.1 to 5% by weight in terms of its oxide ($SiO_2$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$), and at least one filler selected from the group consisting of cordierite, mullite, β-eucryptite, β-spodumene, petalite, zirconyl phosphate, alumina, potash feldspar, soda feldspar, kaolin, sericite and silica, in an amount of 1 to 30% by weight based on the weight of the glass composition.

10. The resistor according to claim 9, wherein said high-resistance layer has a thickness of 10 $\mu$m to 500 $\mu$m.

11. The resistor according to claim 9, further comprising electrodes formed on main surfaces of the resistive body opposed to each other, respectively, and each electrode is formed such that a distance between an outer peripheral edge of the electrode and an outer peripheral surface the side face high-resistance layer is from 0 to the total of the thickness of the high-resistance layer+0.01 mm.

12. The resistor according to claim 9, comprising another side face high-resistance layer provided beneath said side face high-resistance layer defined in claim 9, said another side face high-resistance layer comprising zinc silicate and zinc antimony spinel.

13. A voltage nonlinear resistor comprising a voltage nonlinear resistive body comprising zinc oxide; and a side face high-resistance layer provided on the side face of the resistive body, the high-resistance layer comprising a glass composition containing zinc in an amount of 1.0 to 25% by weigh in terms of its oxide (ZnO), boron in an amount of 1.0 to 10% by weight in terms of its oxide ($B_2O_3$), aluminum in an amount of 0.05 to 3% by weight in terms of its oxide ($Al_2O_3$), and barium in an amount of 0.05 to 3% by weight in terms of its oxide (BaO), with bismuth being substantially the balance in terms of its oxide ($Bi_2O_3$), and at least one filler selected from the group consisting of cordierite, mullite, β-eucryptite, β-spodumene, petalite, zirconyl phosphate, alumina, potash feldspar, soda feldspar, kaolin, sericite and silica, in an amount of 1 to 30% by weight based on the weight of the glass composition.

14. The resistor according to claim 13, wherein said high-resistance layer has a thickness of 10 βm to 500 βm.

15. The resistor according to claim 13, further comprising electrodes formed on main surfaces of the resistive body opposed to each other, respectively, and each electrode is formed such that a distance between an outer peripheral edge of the electrode and an outer peripheral surface the side face high-resistance layer is from 0 to the total of the thickness of the high-resistance layer+0.01 mm.

16. The resistor according to claim 13, comprising another side face high-resistance layer provided beneath said side face high-resistance layer defined in claim 13, said another side face high-resistance layer comprising zinc silicate and zinc antimony spinel.

* * * * *